United States Patent [19]

Graaff

[11] Patent Number: 5,419,456
[45] Date of Patent: May 30, 1995

[54] CONNECTION BETWEEN THE LOWER END OF A SIDE WALL PLATE AND THE BOTTOM PLATE OF A LARGE CONTAINER

[75] Inventor: Wolfgang Graaff, Hildesheim, Germany

[73] Assignee: Graaff GmbH, Germany

[21] Appl. No.: 163,172

[22] Filed: Dec. 7, 1993

[30] Foreign Application Priority Data

Dec. 8, 1992 [DE] Germany .................. 42 41 268.4

[51] Int. Cl.$^6$ ............................................. B65D 25/18
[52] U.S. Cl. .................................... 220/610; 220/1.5; 220/430
[58] Field of Search ............... 220/610, 622, 627, 692, 220/1.5, 430, 431, 444, 901

[56] References Cited

U.S. PATENT DOCUMENTS

| | | | |
|---|---|---|---|
| 1,531,027 | 3/1925 | Richards | 220/430 X |
| 1,789,642 | 1/1931 | Wirth | 220/692 X |
| 1,990,973 | 2/1935 | Baker | 220/430 |
| 2,073,990 | 3/1937 | Koch | 220/1.5 |
| 2,838,592 | 6/1958 | Feketics | 220/677 |
| 3,150,794 | 9/1964 | Schlumberger et al. | 220/901 X |
| 4,116,150 | 9/1978 | McCown | 220/901 X |
| 4,452,162 | 6/1984 | Harbaugh | 220/901 X |
| 5,201,432 | 4/1993 | Elvin-Jensen | 220/1.5 |

Primary Examiner—Steven M. Pollard
Attorney, Agent, or Firm—Levine & Mandelbaum

[57] ABSTRACT

The present invention pertains to a design of the connection between the lower end of a side wall plate 1 and the corresponding longitudinal edge of the bottom plate 2 of a large container. Both the side wall plate 1 and the bottom plate 2 are prefabricated sandwich plates. After the two plates 1, 2 have been joined, a free space 12, which is subsequently filled with foam, is initially left in the transition area between the side wall plate 1 and the bottom plate 2. The transition area or the free space 12 that is subsequently filled with foam is covered, on the one hand, by an inner cover profile 13 between the upper cover plate 7 of the bottom plate 2 and the inner cover plate 4 of the side wall plate 1, and, on the other hand, by an outer cover profile 11 between the outer cover plate 3 of the side wall plate 1 and the lower cover plate 6 of the bottom plate 2. The outer cover profile 11 is in contact, from the outside, with the outer cover plate 3 of the side wall plate 1 and with the front side of the bottom plate 2, which is associated with this side wall. The inner cover profile 13 lies on the inner side of the inner cover plate 4 of the side wall plate 1 and on the top side of the upper cover plate 7 of the bottom plate 2 (FIG. 1).

13 Claims, 4 Drawing Sheets

CONNECTION BETWEEN THE LOWER END OF A SIDE WALL PLATE AND THE BOTTOM PLATE OF A LARGE CONTAINER

BACKGROUND OF THE INVENTION

The present invention pertains to the connection between the lower end of a side wall plate and the bottom plate of a large container.

It has been known in the manufacture of large containers from prefabricated sandwich panels that the sandwich panel for the container bottom is not filled with foam up to the edges that belong together during its preparation, but the solid foam block formed between the cover plates is allowed to end offset in the inward direction in relation to the plate edges. A bottom plate thus prefabricated and a likewise prefabricated side wall plate are laid or inserted in a mold, and a free space, which is temporarily covered by wall parts of the mold, is formed in the area between the front sides of the support foam layers of the bottom plate and the side wall plate. The components of the support foam are introduced into the chamber thus formed, which is closed on all sides, and filled with foam. During solidification, the support foam becomes firmly connected to the front sides of the support foam layers of the side wall and the bottom, but not to the wall parts of the mold due to their special pretreatment. Once the support foam has solidified and become firmly connected to the support foam layers of the side wall and the bottom as well as parts of the cover plates of the side wall and the bottom, the mold walls are removed, and the solid foam body, lying exposed in the transition area, is planked, so that a double wall, which is led beyond the edge between the bottom plate and the side wall and consists of two cover plates and a continuous solid foam layer, is obtained.

It has also been known that the planking of the support foam in the transition area can be placed into the mold prior to the formation of the support foam, so that the support foam also forms a firm connection with it during solidification, and the finished connection is obtained when the container is removed from the mold, or the mold is removed from the container.

In particular, a corner connection has been known, in which the corner area initially left free between the bottom plate and a wall plate of the container, both of which were made as sandwich panels and then assembled, is filled with foam on the site (in situ), while the transition walls between the bottom plate and the wall plate are initially still missing and are replaced by plates of a die, the hollow space thus formed is filled with foam, and an outer cover profile is glued to the foam body after the latter has solidified and comes into contact from the outside with the outer cover plate of the side wall and a surface of the bottom plate, while an inner cover profile is hung in a hinge of the upper bottom cover plate and is folded onto the outside of the inner side wall cover plate (DE 40 03 929). In the folded-up position, the inner cover profile is then glued or connected in another suitable manner to the support foam of the transition area and possibly the inner side wall cover plate. In the folded-up position, the inner cover profile forms, at its upper end, together with the inner side wall cover plate, a groove or channel, into which a sealing cord is pressed in order to prevent liquid from penetrating into the side wall and possibly even into the bottom, because the support foam layer would otherwise roll off. This necessary design of a seal is not only expensive, but also represents a source of hazard, because tools may be caught in the channel during work, and the channel wall formed by the inner cover profile may be extended and may break off.

SUMMARY OF THE INVENTION

The task of the present invention is to show especially appropriate solutions for the connection between a side wall plate and the bottom plate of a large container. The present invention pertains to the connection itself and to a process for preparing the connection according to the claims.

DESCRIPTION OF THE DRAWINGS

The present invention will be explained in greater detail below on the basis of the drawing, where each of FIGS. 1 through 4 of the drawing represents an embodiment of the present invention.

DESCRIPTION OF THE PREFERRED EMBODIMENT

Figure 1:
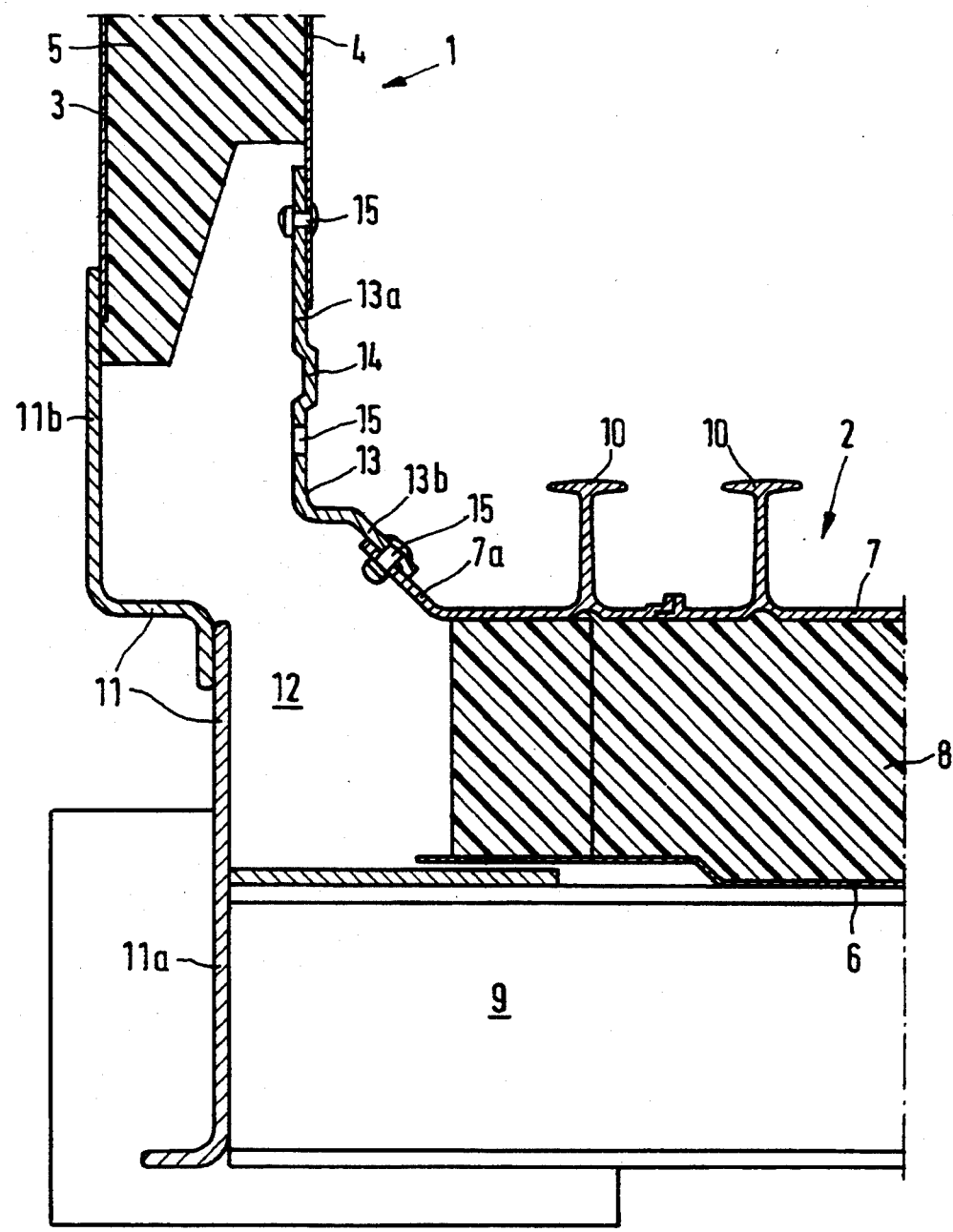

A side wall 1 and the bottom 2 of a large container are formed by a sandwich panel each, in which the space between two cover plates made of metal or the like is filled with a core consisting of solid foam. A solid foam block may have been planked with a cover plate on both sides, or the cover plates may have been placed into a mold, flowable foam components may have been introduced into the space of defined volume, closed on all sides by the cover plates and parts of the mold, and filled with foam, so that a support foam consisting of solid foam was formed and became firmly connected to the cover plates.

Each figure of the drawing represents a cross section through a container in the area in which a said side wall 1 and the said bottom 2 of the container abut. The said side wall 1 or side wall plate has an outer side wall cover plate 3, an inner side wall cover plate 4, and the support layer 5 of solid foam, which is located between the said cover plates 3, 4 and is connected thereto. The said bottom 2 or bottom plate has a lower bottom cover plate 6, an upper bottom cover plate 7, and the support layer 8 consisting of solid foam, which is connected thereto. The said bottom plate is reinforced by outer crossbeams 9, and the said upper bottom cover plate 7 has longitudinal ribs 10. Both the said bottom plate 2 and the said side wall plate 1 are filled with foam or are provided with a said respective support or solid foam layers 5 and 8 such that the said respective support or solid foam layers 5 and 8 do not entirely reach the respective plate edge, or the cover plates project beyond the support layer by a predetermined amount.

The said side wall plate 1 and said bottom plate 2 thus prepared are positioned in a mold in the intended association with one another during the manufacture of a container. A wall 11, which is essentially a vertical sheet metal 11a or the like, which is bent to the outside at the lower end, is attached to the front sides of the said crossbeams 9, and extends from the lower ends of the said crossbeams freely over the said crossbeams in the upward direction nearly to the top side of the said bottom plate, is mounted on the said bottom plate in the longitudinal direction of the container. A sheet metal 11b or the like, bent in the shape of a Z, is inserted between the upper end of the said sheet metal 11a or the like and the lower end of the outer side wall plate 3. The shape of a Z is selected because the outer ends of the said bottom crossbeam 9 end behind the vertical plane, in which the said outer side wall cover plate 3 extends. The said wall 11 with the said parts 11a and 11b forms an outer cover profile for the initially still free space 12 between the said front sides of the said bottom plate 2 or the said bottom plate support layer 8 and the said side wall plate 1 or the said side wall plate support layer 5.

The said initially still free space 12 is correspondingly covered toward the inside of the container by an inner cover profile 13. The said inner cover profile 13 has an upper leg 13a and a lower leg 13b, of which the said upper leg 13a is reinforced by a longitudinal rib 14. The said lower leg 13b forms an obtuse angle of about 135° with the said upper leg in order to come to lie on a correspondingly upwardly bent, smooth edge 7a of the said upper bottom cover plate 7. The said upper leg 13a lies with its smooth edge behind the said inner side wall cover plate 4. To make this possible, the said side wall support layer 5 ends above the lower edge of the said side wall cover plate 4, while the side wall support layer 5 projects beyond the lower edge of the said side wall cover plate 3 in the area of the said outer side wall cover plate 3, so that it is covered there by the said part 11b after it has been associated with the said outer cover profile 11. The said cover profiles 11, 13, the thickness of the said side wall plate 1 and of the said bottom plate 2, as well as the said still free space 12 are dimensioned such that when associated with the said side wall plate 1 and the said bottom plate 2, the said inner cover profile 13 can be brought behind the said inner side wall cover plate 4 and to the top side of the said upper bottom cover plate 7 and it can also be tilted, if desired, unless it is preferred that the said inner cover profile 13 be pushed into the said free space 12 from the said side wall plate and bottom plate ends and over the said edge 7a of the said upper bottom cover plate 7. If the said inner cover profile 13 is to be rigidly connected to the said two plates 1, 2, rivets 15, which are distributed over the length of the said cover profile 13 and are preferably prior-art explosive-type rivets, are used. The said outer cover profile 11 is connected to the said side wall plate 1 and to the said bottom plate 2 in a corresponding manner or in another suitable manner. When the said bottom plate 2 and the said side wall plate 1 have been connected to one another in this manner by the said outer cover profile 11 and the said inner cover profile 13, the said free space 12, closed at its ends by suitable shuttering panels, can be filled with foam. To do so, one of the said cover profiles 11, 13, preferably the said inner cover profile 13, has inlet openings 15 distributed over its length, through which the flowable foam components can be introduced into the said free space 12, after which they foam and form a rigid connection with the inner sides of the said cover profiles 11, 13 and with the said front sides of the said support layers 5, 8 on solidification into a supporting solid foam. Depending on the permissible foaming pressure, this can be done without external support of the said cover profiles 11, 13, or with external support of these cover profiles in a corresponding mold.

After the support foam introduced into the said free space 12 has solidified, connection of good angular rigidity is obtained between the said side wall plate 1 and the said bottom plate 2, which properly fits into the contour of the container, projects slightly beyond the contour formed by the said side wall plate 1 and the said bottom plate 2, has only a few areas that could give rise to the settling of dirt, and does not permit stagnant moisture to accumulate. This should be taken into account when the said openings 15 are closed after the said space 12 has been filled with foam. This is achieved most simply by the solid foam being formed in the known manner.

Figure 2:
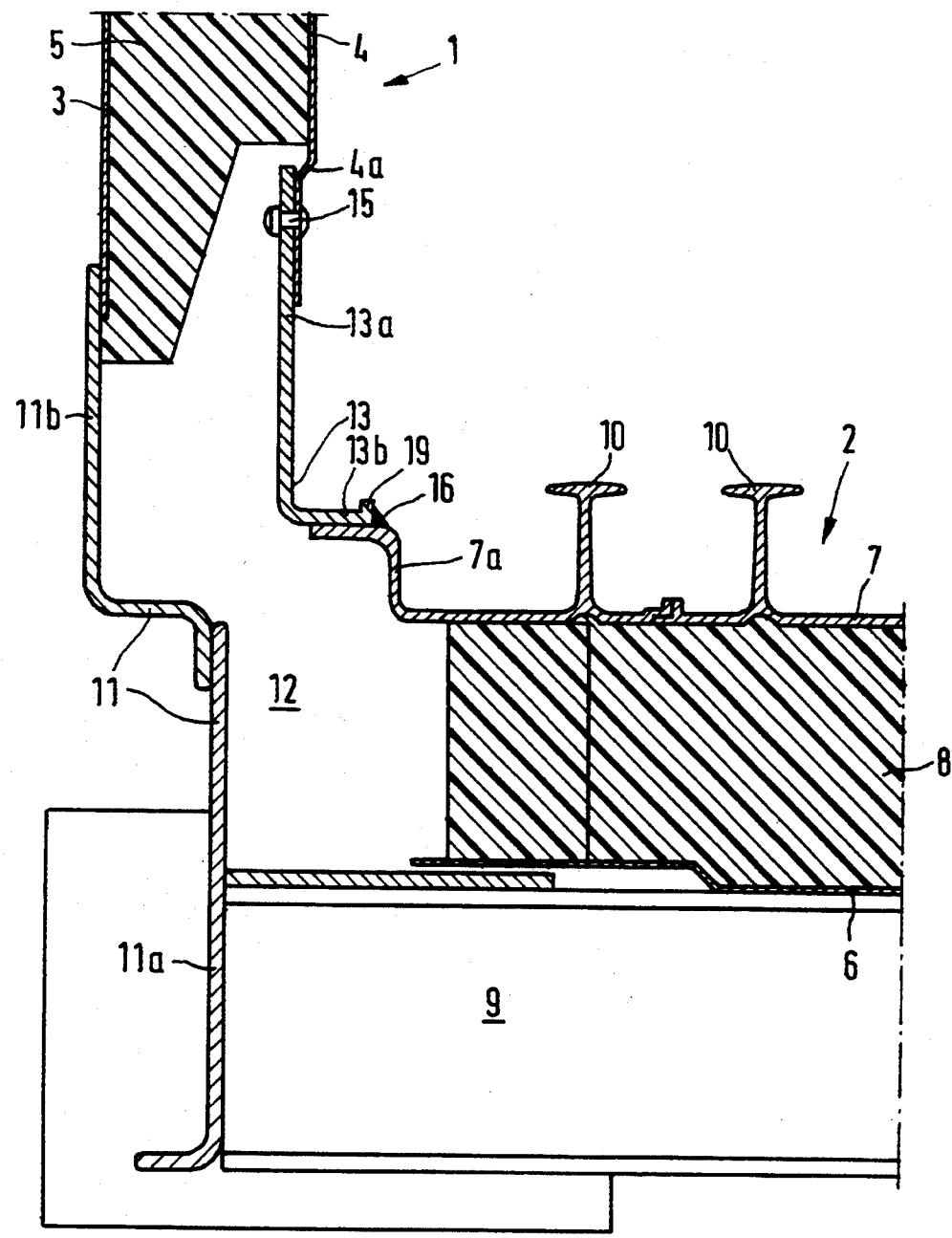

The solution according to FIG. 2 differs from the solution according to FIG. 1 by the design of the said inner cover profile 13, as well as by a slightly different design of the edge areas of the said inner side wall cover plate 4 and of the said upper bottom cover plate 7. The said two legs 13a and 13b of the said inner cover profiles 13 form a right angle. The said upper leg 13a is again located behind the said inner side wall cover plate 4, whose edge 4a is, however, pulled toward the inner area of the plate such that the said fastening means 15 between the said inner cover profile 13 and the said side wall plate 1 do not project beyond the plane in which the said inner side wall cover plate 4 is located, aside from the said edge area 4a.

The said edge area 7a of the said upper bottom cover plate 7 forms a step in the upward direction, on the upper, horizontal flange of which the said lower, horizontal leg 13b of the said inner cover profile 13 lies, namely, in a plane that is located slightly below the horizontal plane, which is defined by the top sides of the heads of the said longitudinal ribs 10 of the said bottom plate 2.

The said inner cover profile 13 and the said side wall plate 1 are connected, as in the design according to FIG. 1, by the said above-mentioned rivets 15. The said inner cover profile 13 and the said bottom plate 2 are connected by a weld seam 16 in front of the front side of the said lower, horizontal leg 13b of the said inner cover profile and in front of the said upper, horizontal flange of the said edge area 7a of the said upper bottom cover plate 7 close to the inner end of this flange and to the vertical web between the said upper, horizontal flange and the said actual upper bottom cover plate 7.

The embodiment according to FIG. 2 otherwise corresponds to the embodiment according to FIG. 1 in terms of design, action, and advantages.

Figure 3:
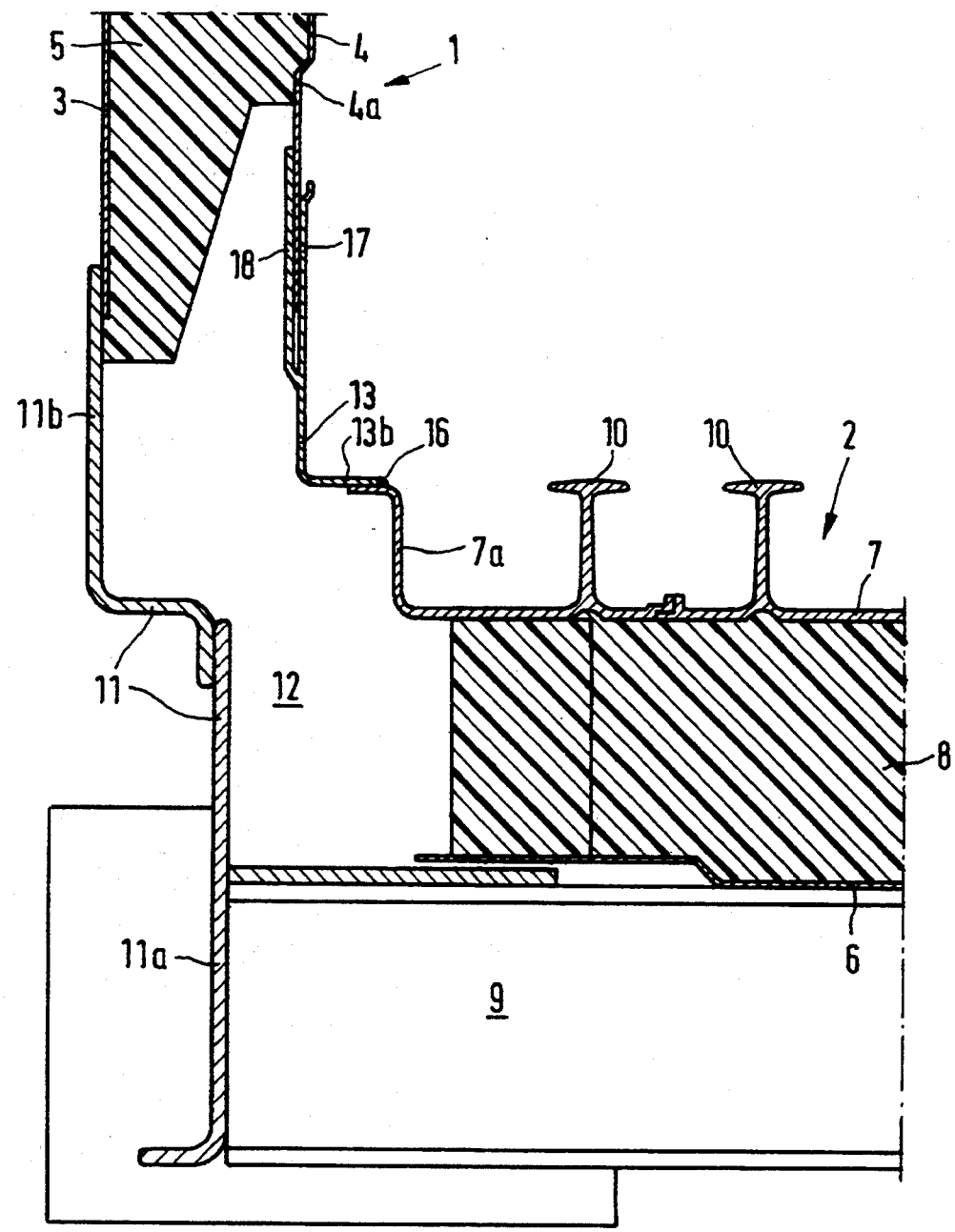

The embodiment according to FIG. 3 is a modification of the embodiment according to FIG. 2, in the manner that the said vertical leg 13a of the said inner edge profile 13 is designed as a fork, into which the lower edge area of the said inner side wall cover plate 4 is introduced. It is introduced over an essential length or height and essentially without clearance, so that the said side wall plate 1 and the said inner cover profile 13 are connected to one another without any special fastening means. The outer bracket 17 of the said fork lies in the plane in which the said inner side wall cover plate 4 is located, before it jumps back, with its said edge area 4a, at least an essential part of which is received by the said fork, into the inside of the plate over a corresponding distance. The said bracket 17 is bent slightly to the outside at its upper edge in order to form a channel, into which a sealing cord is to be inserted, with the said inner side wall cover plate. Even though there is agreement in this respect with one of the corner connections described as the state of the art, a considerable advantage is offered compared with the state of the art, because moisture would first meet the labyrinth gland formed by the said fork and the said inner side wall cover plate inserted, which alone would "offer"—a certain protection against or would extensively prevent the penetration of moisture into the inside of the wall.

While the channel with sealing cord is indispensable according to the state of the art, this solution is an option here for the greatest possible safety, at the expense of a certain risk of accident, which can be omitted, or which can be made the subject of a decision on a case-by-case basis.

The said lower, horizontal leg 13b of the said inner cover profile 13 ends smoothly and in a said weld seam 16, contrary to the embodiment according to FIG. 2, where the said lower, horizontal leg 13b of the said inner cover profile 13 ends in an upwardly directed edge strip.

Figure 4:
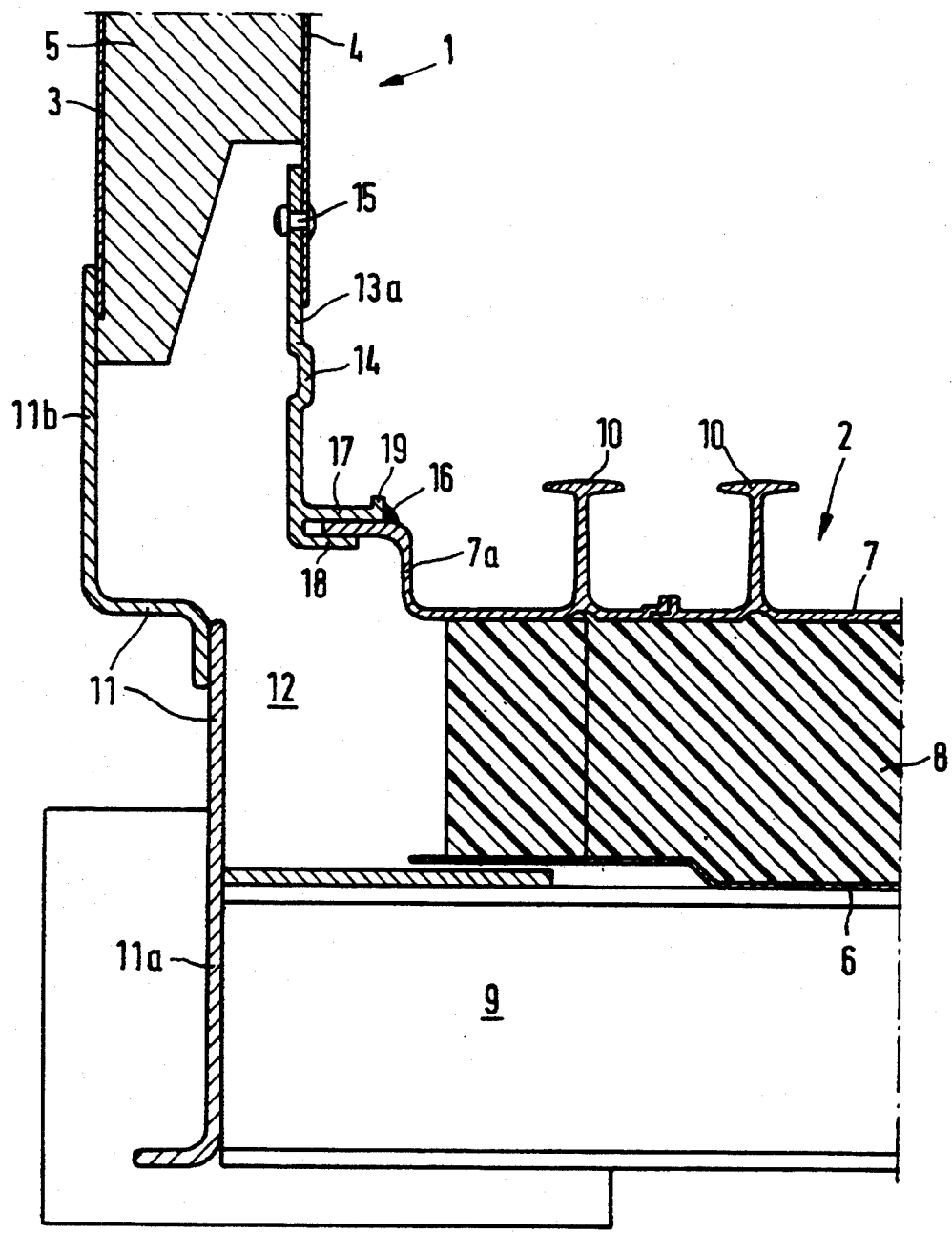

Finally, the said upper, vertical leg 13a of the said inner cover profile 13 in the embodiment according to FIG. 4 is designed and is connected to the said inner side wall cover plate 4, as in the embodiment according to FIG. 1. The said lower, horizontal leg 13b of the said inner cover profile 13 is designed, in contrast, as a fork with the said brackets 17, 18, in order to receive the said edge zone 7a of the said upper bottom cover plate 7, which is bent upward in the form of a step according to FIGS. 2 and 3, with an extremely small clearance. However, since the said fork with the said brackets 17, 18 grasps the said edge area 7a or its upper, horizontal section over a relatively short length only, the said upper bracket 17 is welded to the said upper bottom cover plate with a said weld seam 16.

I claim:

1. Connection between the lower end of a side wall plate and the corresponding longitudinal edge of the bottom plate of a large container, wherein both the side wall and the bottom plate are prefabricated sandwich panels, and a free space is initially left in the transition area after the two plates have been joined together, and the said free space is then filled with foam, wherein the transition area filled with foam is covered by an inner cover profile between the upper cover plate of the bottom plate and the inner cover plate of the side wall plate, as well as by an outer cover profile between the outer cover plate of the side wall plate and the lower cover plate of the bottom plate, wherein the outer cover profile is in contact from the outside with the outer side wall cover plate and with the front side of the bottom plate, which front side is associated with the side wall, while the inner cover profile lies on the inside of the inner side wall cover plate and on the top side of the upper bottom cover plate.

2. Connection in accordance with claim 1, wherein the inner cover profile lies, with a smooth edge strip each, on both the inside of the inner side wall cover plate and on the top side of the upper bottom cover plate.

3. Connection in accordance with claim 2, wherein the edge areas of the upper bottom cover plate and of the inner cover profile, which edge areas cover one another and lie one on top of another, extend obliquely to both the bottom plate and the side wall plate.

4. Connection in accordance with claim 3, wherein the edge areas of the upper bottom cover plate and of the inner cover profile, which edge areas cover on another and lie one on top of another, extend at an angle of 45° to the bottom plate, obliquely to both the bottom plate and the side wall plate.

5. Connection in accordance with claim 4, wherein the inner cover profile is designed as a self-reinforcing cover profile and has longitudinal ribs for this purpose.

6. Connection in accordance with claim 1, wherein the inner cover profile has a rectangular cross section with smooth legs, wherein the leg belonging to the bottom plate has an edge strip bent upward on one side.

7. Connection in accordance with claim 6, wherein the bottom plate-side leg of the inner cover profile and the upper bottom cover plate are connected by a weld seam in front of the front side of the bottom plate-side leg of the inner cover profile.

8. Connection in accordance with claim 7, wherein the edge of the upper bottom cover plate, which edge is connected to the inner cover profile, is offset in the upward direction in relation to the actual bottom plate, and the bottom plate-side leg of the inner cover profile is close to the inner edge of the upwardly offset edge of the upper bottom cover plate.

9. Connection in accordance with claim 5, wherein the inner cover profile, on the one hand, and the inner side wall cover plate as well as the upper bottom cover plate, on the other hand, are connected by rivets.

10. Connection in accordance with claim 9, wherein the rivets are explosive-type rivets.

11. Connection in accordance with claim 1 wherein one leg of the inner cover profile has a fork-shaped cross section, and the inner side wall cover plate or the upper bottom cover plate is introduced into this fork.

12. Connection in accordance with claim 11, wherein the inner side wall cover plate or the upper bottom cover plate is introduced into the fork without clearance and to the extent that no additional fastening means are necessary in the area of the fork.

13. Connection in accordance with claim 12, wherein the inner side wall cover plate is introduced into the fork of the inner cover profile and the inner side wall cover plate is bent at right angles in front of the fork into the inside of the side wall plate to the extent that the outside of the side wall cover plate and the outside of the leg of the cover profile, which leg is in contact with the side wall cover plate on the outside, are located in one vertical plane.

* * * * *